(12) United States Patent
Hegar et al.

(10) Patent No.: US 10,057,506 B2
(45) Date of Patent: Aug. 21, 2018

(54) METHOD AND/OR APPARATUS FOR FRAME ACCURATE HOT FAILOVER

(71) Applicant: Amazon Technologies, Inc., Reno, NV (US)

(72) Inventors: Ryan P. Hegar, Happy Valley, OR (US); Kevin G. Moore, Portland, OR (US); David Montgomery, Portland, OR (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 128 days.

(21) Appl. No.: 15/332,952

(22) Filed: Oct. 24, 2016

(65) Prior Publication Data

US 2017/0041555 A1 Feb. 9, 2017

Related U.S. Application Data

(63) Continuation of application No. 14/487,318, filed on Sep. 16, 2014, now Pat. No. 9,479,720.

(51) Int. Cl.
*H04N 7/12* (2006.01)
*H04N 5/268* (2006.01)
*H04N 21/43* (2011.01)
*H04N 21/433* (2011.01)
*H04N 21/442* (2011.01)
*H04L 29/06* (2006.01)
*H04N 19/40* (2014.01)
*H04N 19/895* (2014.01)
*H04N 5/44* (2011.01)

(52) U.S. Cl.
CPC .......... *H04N 5/268* (2013.01); *H04L 65/605* (2013.01); *H04L 65/607* (2013.01); *H04N 5/44* (2013.01); *H04N 19/40* (2014.11); *H04N 19/895* (2014.11); *H04N 21/4302* (2013.01); *H04N 21/4331* (2013.01); *H04N 21/44209* (2013.01)

(58) Field of Classification Search
CPC ...................................... H04N 5/268
See application file for complete search history.

(56) References Cited

U.S. PATENT DOCUMENTS 8,639,875 B1 1/2014 Estan
9,787,986 B2* 10/2017 Dunphy ................. H04N 19/40
2005/0066148 A1 3/2005 Luick
(Continued)

OTHER PUBLICATIONS

"Notice of Allowance dated Jul. 8, 2016" received in U.S. Appl. No. 14/487,318.

*Primary Examiner* — Tracy Y Li
(74) *Attorney, Agent, or Firm* — Hogan Lovells US LLP

(57) ABSTRACT

A method for switching between two redundant bitstreams. The first bitstream may be presented to a first pipeline. The second bitstream may be presented to a second pipeline. The first bitstream and the second bitstream may contain redundant information received from independent sources. If the first bitstream fails, the method may present an output of the second pipeline to the output pipeline. Data in a buffer in the second pipeline may be used to pass a next frame to the output pipeline. A size of a buffer of the first pipeline and a size of the buffer in the second pipeline may be adjusted based on a time of reception of the first and the second bitstream.

20 Claims, 10 Drawing Sheets

(56) References Cited

U.S. PATENT DOCUMENTS

| | | | |
|---|---|---|---|
| 2005/0110662 A1* | 5/2005 | Mukherjee | H04N 21/234327 341/50 |
| 2007/0058672 A1* | 3/2007 | Kim | H04L 1/0009 370/466 |
| 2009/0083279 A1* | 3/2009 | Hasek | H04L 67/2823 |
| 2011/0211576 A1* | 9/2011 | Lai | H04L 12/1836 370/390 |
| 2011/0310995 A1* | 12/2011 | Dougherty, III | G02B 27/22 375/295 |
| 2012/0047229 A1* | 2/2012 | Bennett | G02B 27/22 709/217 |
| 2012/0047535 A1* | 2/2012 | Bennett | G09G 3/003 725/62 |
| 2013/0156094 A1* | 6/2013 | Syed | H04N 21/23424 375/240.02 |
| 2013/0227573 A1 | 8/2013 | Morsi | |
| 2013/0272374 A1* | 10/2013 | Eswaran | H04L 65/602 375/240.02 |
| 2013/0343450 A1* | 12/2013 | Solka | H04N 19/40 375/240.03 |
| 2014/0075425 A1* | 3/2014 | Stevenson | G06F 8/656 717/171 |
| 2014/0355625 A1* | 12/2014 | Chen | H04L 65/605 370/468 |
| 2015/0319268 A1 | 11/2015 | Callard | |

\* cited by examiner

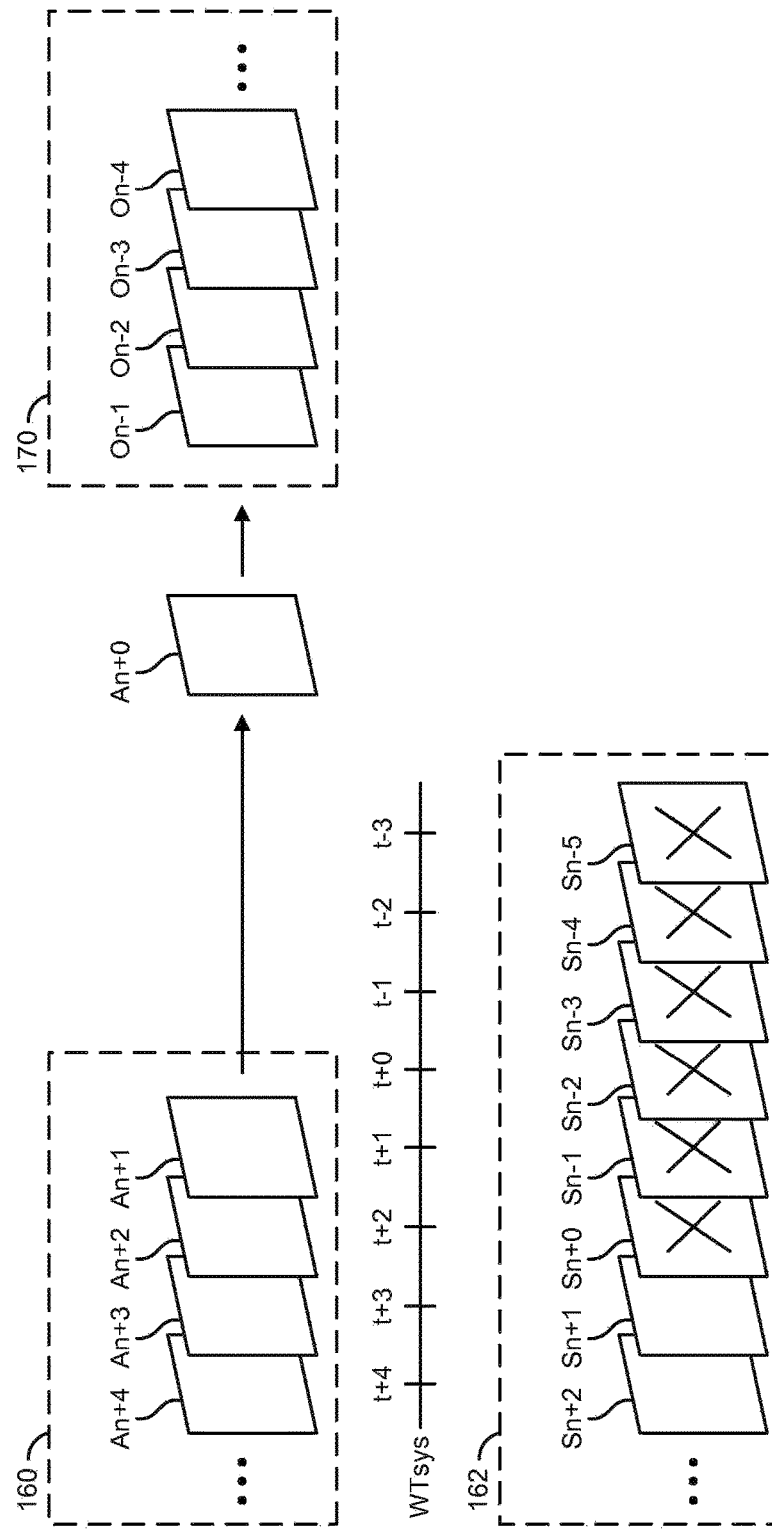

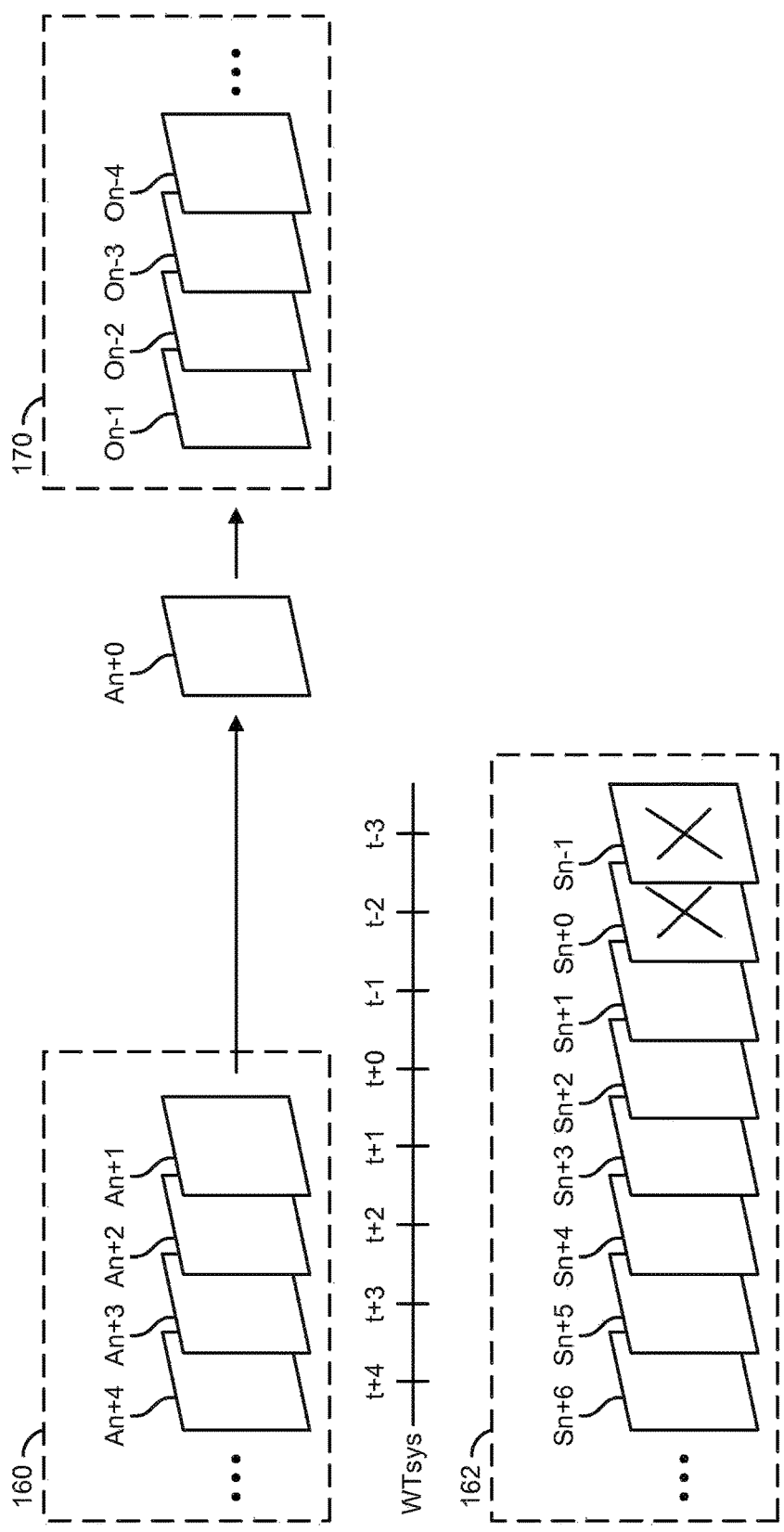

METHOD AND/OR APPARATUS FOR FRAME ACCURATE HOT FAILOVER

CROSS-REFERENCES TO RELATED APPLICATIONS

This application is a continuation of allowed U.S. application Ser. No. 14/487,318, entitled "METHOD AND/OR APPARATUS FOR FRAME ACCURATE HOT FAILOVER," filed Sep. 16, 2014; of which the full disclosure of this application is incorporated herein by reference for all purposes.

FIELD OF THE INVENTION

The present invention relates to video processing generally and, more particularly, to a method and/or architecture for frame accurate hot failover.

BACKGROUND OF THE INVENTION

Conventional live transcoding systems accept multimedia inputs (i.e., inputs containing video, audio, captions, etc.) in real time. Such systems transcode those inputs in one of many ways (for instance, by changing the video compression) and generate streams presented either to a file or to a live output. The operator of such a system often has customers and/or advertisers that rely on the output of the live transcoding system. The stability of the output is imperative. To help ensure a reliable output, some live transcoding systems accept multiple redundant inputs (for instance, the same multimedia content delivered as a MPEG2 transport stream over user datagram protocol (UDP) on two different network interface controllers (NICs)). Failover from one input (the active input) to the other (the standby input) occurs if a problem is detected in the former. The failover from one input to the next is usually detectable on the output in one of many undesirable ways. In the best case, an input freeze or black picture is created. In the worst case, the output transport stream is totally corrupted.

In conventional systems, the failover transition is not frame accurate. After the failover, the video and audio content does not resume with the next frame that would have been output had a failover not occurred. Lack of frame accuracy results in either a segment of the input content never reaching the output or in retransmission of video and audio frames that have already been transmitted on the output. The problem is exacerbated when the active and standby inputs arrive across different networks (to avoid a network failure from interrupting both inputs). Different networks often have different delays. One input may be delayed considerably relative to the other.

Another problem with conventional systems is that the failover transition from one input to the next input takes time which results in an underflow of the output buffer. Such delay produces a time gap in the delivery of output packets. When generating an output for a file, such a delay is often not a concern. When generating a real-time output, like MPEG2 transport streams over UDP, gaps on the output can cause playout issues with down stream decoders, which is undesirable.

It would be desirable to implement frame accurate hot failover in a real-time video transcoding system.

SUMMARY OF THE INVENTION

The present invention concerns a method for switching between two redundant bitstreams comprising the steps of (A) receiving a first bitstream and a second bitstream, where (i) the first bitstream may be presented to a first pipeline and the second bitstream may be presented to a second pipeline and (ii) the first bitstream and the second bitstream may contain redundant information received from independent sources and (iii) an output of the first pipeline may be presented to an output pipeline, (B) processing the first bitstream in the first pipeline and the second bitstream in the second pipeline and (C) if the first bitstream fails, presenting an output of the second pipeline to the output pipeline. Data in a buffer in the second pipeline may be used to pass a next frame to the output pipeline. A size of a buffer of the first pipeline and a size of the buffer of the second pipeline may be adjusted based on a time of reception of the first and the second bitstream.

The objects, features and advantages of the present invention include providing a hot failover method and/or device that may (i) be frame accurate, (ii) avoid overflow and underflow when switching, (iii) produce a fast failover, (iv) align frames of each source using timecodes, (v) avoid visual gaps in the output stream and/or (vi) be cost effective to implement.

BRIEF DESCRIPTION OF THE DRAWINGS

These and other objects, features and advantages of the present invention will be apparent from the following detailed description and the appended claims and drawings in which:

FIG. 7b is a diagram showing buffer occupancy when the arrival of frames in an active input pipeline leads the arrival of frames in a hot standby pipeline;
FIG. 7c is a diagram showing buffer occupancy when the arrival of frames in an active input pipeline lags the arrival of frames in a hot standby pipeline.

DETAILED DESCRIPTION OF THE PREFERRED EMBODIMENTS

The invention provides frame accurate hot failover in a live transcoding system for transitioning from one multimedia input to an alternate multimedia input. The transition may occur without observable audio-visual discontinuities and/or timing anomalies on the output. The invention may provide failover from one input to the other that is both frame accurate and/or that produces no gaps in the output during the failover transition.

Figure 1:
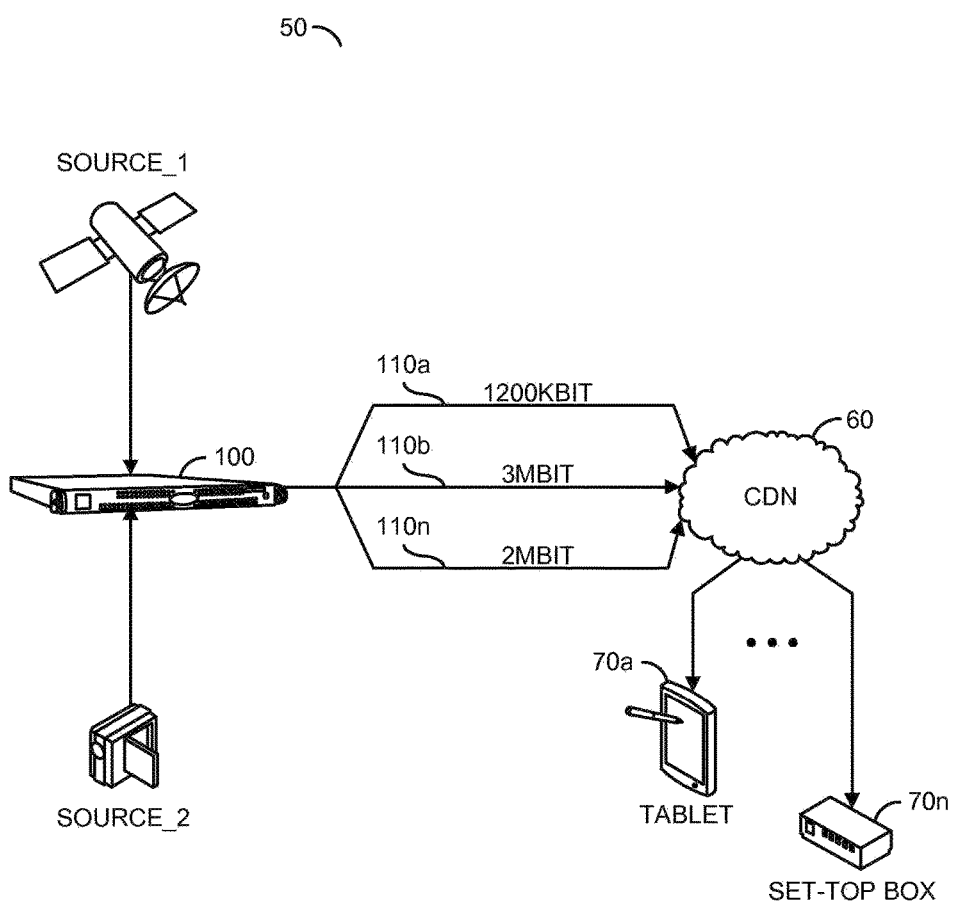
FIG. 1 is a diagram of a context of the present invention.

Referring to FIG. 1, a block diagram of a system 50 is shown providing a context of the present invention. The system 50 is shown comprising a first source (e.g., SOURCE_1), a second source (e.g., SOURCE_2), an apparatus (or device) 100, and a network 60. The signal SOURCE_1 and the signal SOURCE_2 may be redundant signals. The redundant signals SOURCE_1 and SOURCE_2 may be received from independent sources. The independent sources may be from different origins (e.g., satellite, fiber, etc.). In some embodiments, the independent sources may be from the same origin (e.g., the same origin sends redundant data through alternate network paths). The apparatus 100 may generate a number of streams 110a-110n presented to the network 60. The network 60 may be a content delivery network (CDN). The network 60 may deliver multimedia content (e.g, video) to a number of devices 70a-70n. In one example, the apparatus 100 may be implemented as a hardware appliance (or device). In another example, the apparatus 100 may be implemented as a software process and/or operation implemented on a shared processing environment (e.g., Amazon Cloud, etc.).

Figure 2:
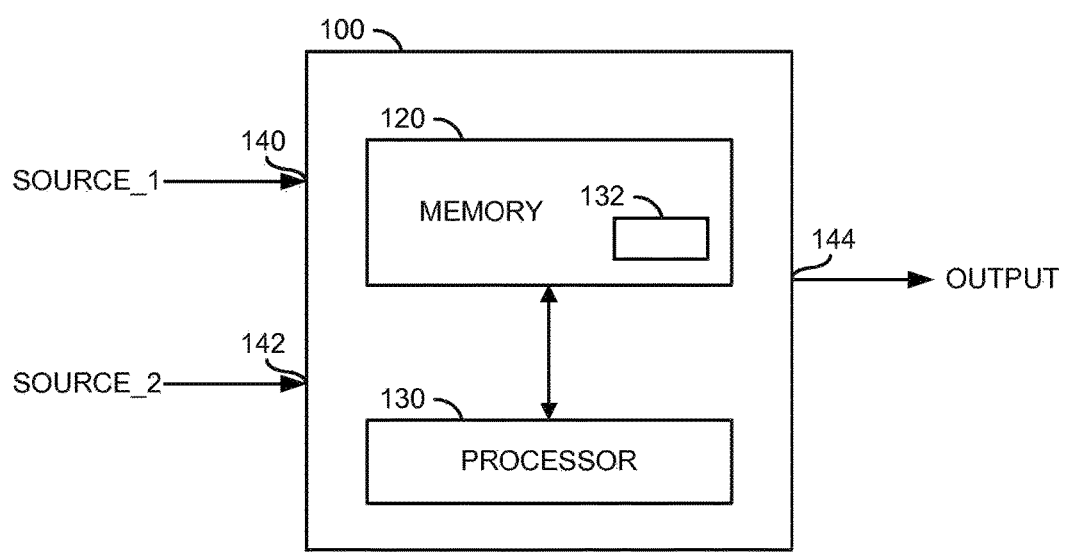
FIG. 2 is a block diagram of the present invention.

Referring to FIG. 2, a block diagram of the apparatus 100 is shown in accordance with an embodiment of the present invention. The apparatus 100 generally comprises a block (or circuit) 120 and a block (or circuit) 130. The circuit 120 may be implemented as a memory. The circuit 130 may be implemented as a processor. The processor 130 may be configured to execute computer readable instructions that, when executed, cause the processor 130 to perform various steps. The memory 120 includes a block 132 that may be implemented as a failover control logic. The apparatus 100 may have an input 140, an input 142 and an output 144. The input 140 may receive the signal SOURCE_1. The input 142 may receive the signal SOURCE_2. The output 144 may present a signal (e.g., OUTPUT). The signal OUTPUT may be generated based on either the signal SOURCE_1 or SOURCE_2 at any moment in time, but may be contributed to by each over time (e.g., once a failover occurs).

Figure 3:
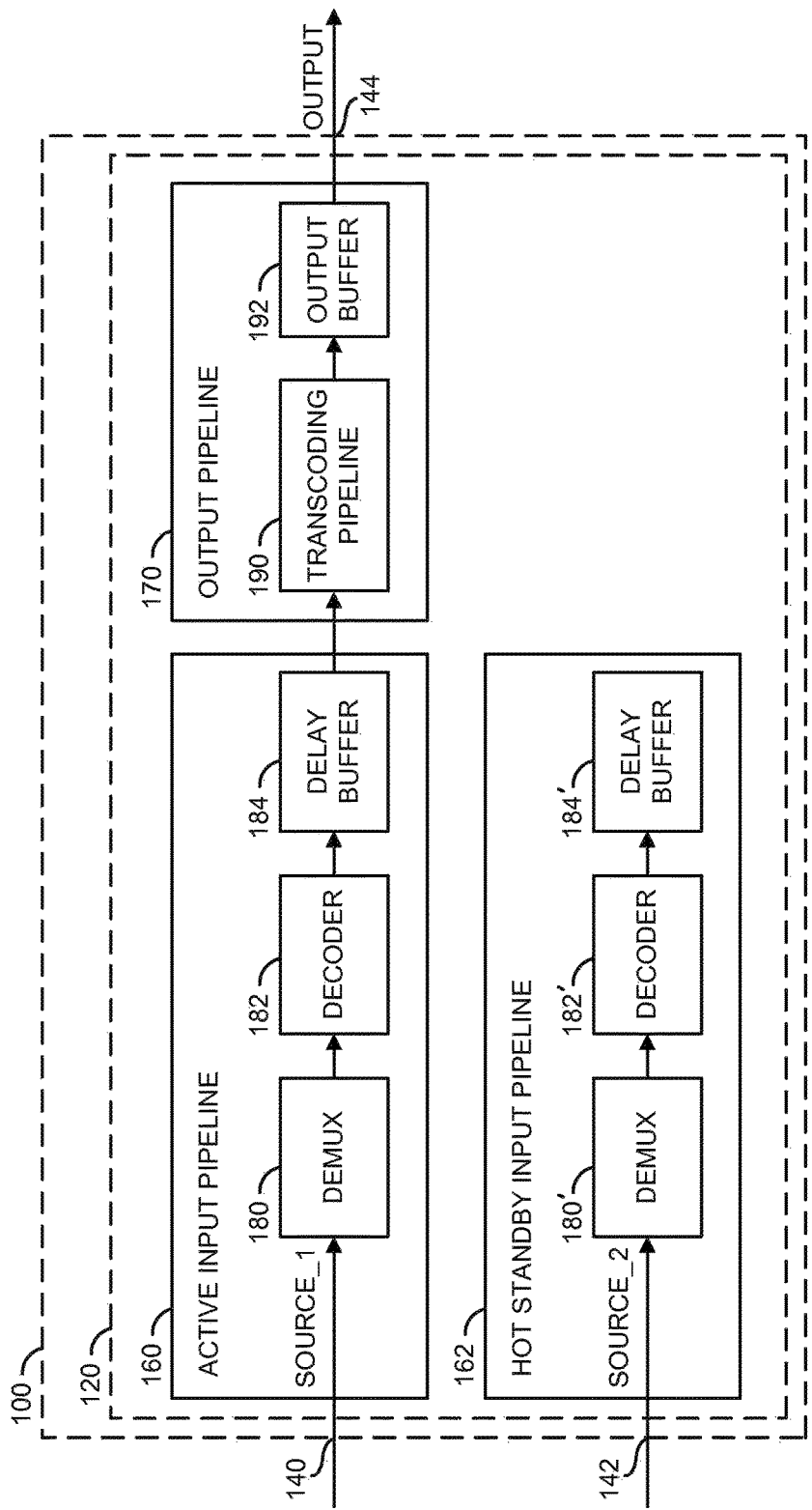
FIG. 3 is a more detailed diagram of the present invention.

Referring to FIG. 3, a more detailed diagram of the apparatus 100 is shown. The memory 120 is shown comprising a pipeline 160, a pipeline 162 and a pipeline 170. The pipeline 160 may be implemented as an active input pipeline. The pipeline 162 may be implemented as a hot standby input pipeline. The pipeline 170 may be implemented as an output pipeline. The pipeline 160 generally comprises a block (or circuit) 180, a block (or circuit) 182 and a block (or circuit) 184. The circuit 180 may be implemented as a demultiplexing circuit. The circuit 182 may be implemented as a decoder circuit. The circuit 184 may be implemented as a delay buffer. Similarly, the pipeline 162 may have a block (or circuit) 180', a block (or circuit) 182' and a block (or circuit) 184'. The circuits 180', 182' and 184' may have similar implementations as the circuits 180, 182 and 184. The output pipeline 170 generally comprises a block (or circuit) 190 and a block (or circuit) 192. The circuit 190 may be implemented as a transcoding pipeline. The circuit 192 may be implemented as an output buffer.

The apparatus 100 may provide live transcoding capable of frame accurate hot failover without observable discontinuities on the signal OUTPUT. The active input pipeline 160 is the input pipeline that is currently providing multimedia data to the signal OUTPUT. The hot standby input pipeline 162 is the backup pipeline. When a failover is detected, the input pipeline that was previously the hot standby input pipeline 162 becomes the new active input pipeline 160. Modifications to the delay buffers 184 and/or 184' will be described in connection with FIGS. 6 and 7. After a failover, the previous active input pipeline 160 becomes the new hot standby input pipeline 162.

The hot standby input pipeline 162 is normally configured to continually provide demuxing, decoding, and/or buffering of data from the standby input SOURCE_2. Decoding the standby input SOURCE_2, even when the standby input will not be passed to the signal OUTPUT, is beneficial for several reasons. For example, actively decoding the signal SOURCE_2 allows the live transcode system 100 to actively monitor the health of the standby input signal SOURCE_2. Such monitoring may help inform the user and/or the failover control logic 132 whether the standby input signal SOURCE_2 is ready to be made active if an interruption to the signal SOURCE_1 occurs. In some embodiments, the health of the signal SOURCE_1 may also be actively monitored. The decoder 182 generates a series of frames in response to the signal compressed bitstream SOURCE_1. By decoding the standby input signal SOURCE_2, then buffering those frames, a hot failover (e.g., a fast failover) may be achieved. Pre-decoding the frames in the hot standby input pipeline 162 may produce a fast failover that may be covered with a smaller output buffer 192.

The delay buffers 184 and/or 184' are used to buffer the decoded frames received from the decoders 182 and/or 182'. The delay buffers 184 and 184' achieve two goals. The input failover is made frame accurate when possible. Alignment of the frames between the pipeline 160 and the pipeline 162 is determined by a plurality of input timecodes associated with the frames from each of the source signals SOURCE_1 and/or SOURCE_2. In general, one input timecode is associated with each frame in each of the source signals SOURCE_1 and/or SOURCE_2. In one example, the timecodes may be implemented as SMPTE timecodes. However, other timecodes may be implemented to meet the design criteria of a particular implementation. Switching between the pipeline 160 and 162 should not cause buffer underfloor or overflow on the signal OUTPUT. Details of the buffers 184 and/or 184' will be described in more detail in connection with FIGS. 6 and 7.

Figure 4:
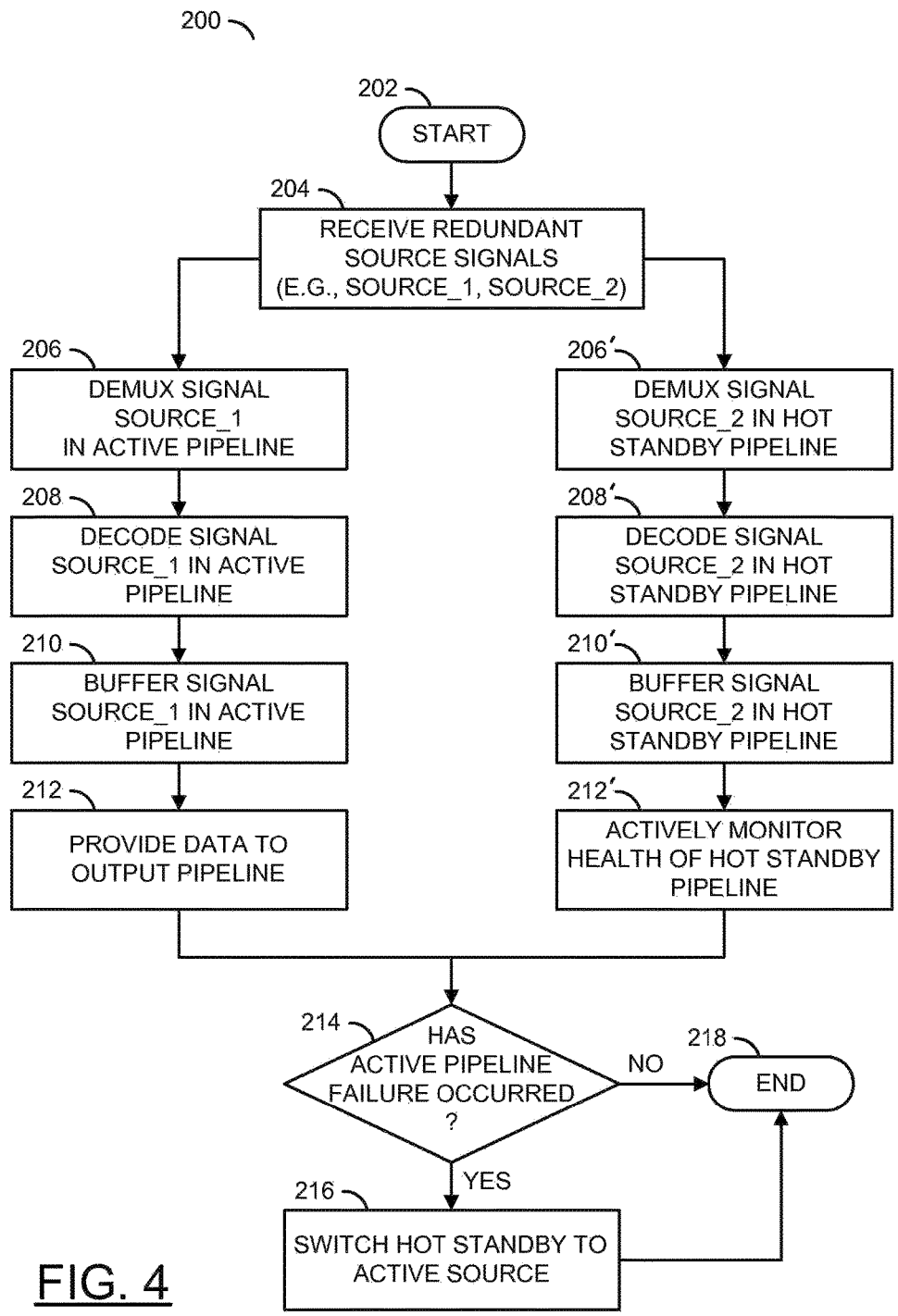
FIG. 4 is a flow diagram of an overall process of the invention.

Referring to FIG. 4, a block diagram of a method (or process) 200 is shown. The process 200 illustrates an overall operation of the device 100. The process 200 generally comprises a step (or state) 202, a step (or state) 204, a step (or state) 206, a step (or state) 208, a step (or state) 210, a step (or state) 212, a decision step (or state) 214, a step (or state) 216 and a step (or state) 218. An alternate branch generally comprises a step (or state) 206', a step (or state) 208', a step (or state) 210', and a step (or state) 212'. The step 202 may be a start state. The step 204 may receive the redundant source signals SOURCE_1 and SOURCE_2. The step 206 may demultiplex the signal SOURCE_1. The step 208 may decode the signal SOURCE_1. The state 210 may buffer the frames decoded from the signal SOURCE_1. The step 212 may provide frame data to the output pipeline 170. The steps 206, 208, 210 and/or 212 generally operate on the active pipeline 160 (e.g., the signal SOURCE_1) Similarly, the steps 206', 208', 210' and 212' generally operate on the standby pipeline 162 (e.g., the signal SOURCE_2). The steps 206', 208' and 210' may be similar to the steps 206, 208 and 210. The step 212' may actively monitor the health of the standby pipeline 162. The decision step 214 may determine if a failure has occurred in the active pipeline 160. if not, the method 200 moves to the step 218, which ends the method 200. If so, the method 200 moves to the state 216, which initiates a switch to the hot standby active source signal SOURCE_2. Next, the step 218 ends the method 200.

Figure 5:
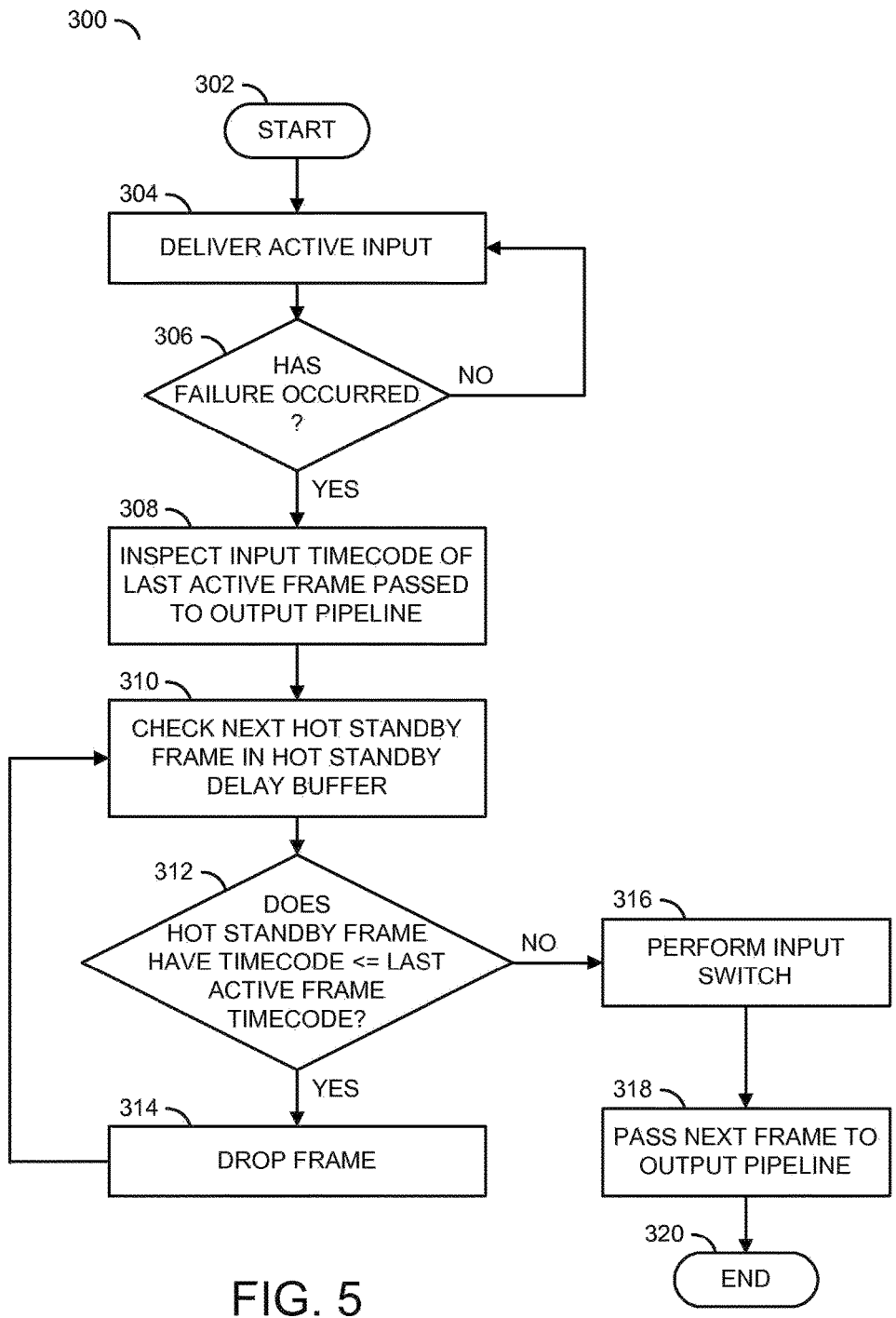
FIG. 5 is a flow diagram of a process showing the detection of the time code and delivery of the next frame during a failure.

Referring to FIG. 5, a block diagram of a method (or process) 300 is shown. The method 300 generally describes the detection of the time code and/or the delivery of the next frame during a transition after a failure. The method 300 generally comprises a step (or state) 302, a step (or state) 304, a decision step (or state) 306, a step (or state) 308, a step (or state) 310, a decision step (or state) 312, a step (or state)

314, a step (or state) 316, a step (or state) 318, and a step (or state) 320. The step 302 may be a start state. The step 304 delivers an active input. The decision state 306 determines if a failure has occurred. If not, the method 300 moves back to the state 304. If so, the method 300 moves to the state 308. The state 308 inspects the input timecode of the last frame passed to the output pipeline 170. Next, the state 310 checks the next hot standby frame in the hot standby delay buffer 184'. Next, the decision state 312 determines if a hot standby frame has a timecode less than or equal to the last active frame timecode. If so, the method 300 moves to the state 314, which drops a frame. If not, the method 300 moves to the state 316, which performs an input switch. Next, the state 318 passes the next frame to the output pipeline. The state 320 ends the method 300.

In some embodiments the timecode of frames may be used for selecting a proper frame to failover to. For example, the timecode of each frame may be inspected. In another example, the timecode may be used to calculate a number of frames to drop at once. In some embodiments other methods of lining up frames from the active and/or standby input pipelines may be implemented. In one example, an absolute sum of differences of the decoded pictures on each pipeline may correlate pictures. The type of method to determine which frame in the hot standby input pipeline should be next (e.g., the frame to failover to) may be varied to meet the design criteria of a particular implementation.

Figure 6:
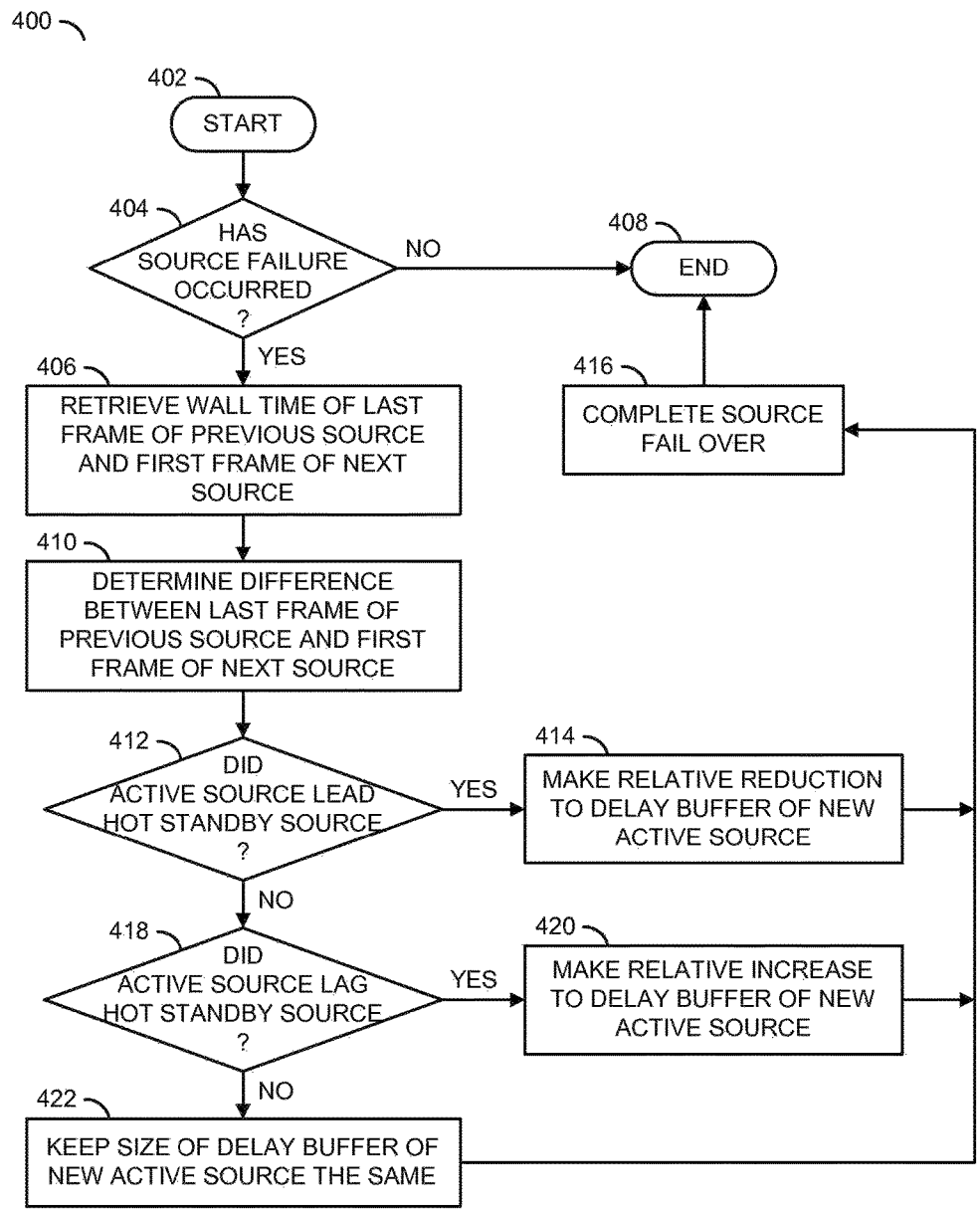
FIG. 6 is a flow diagram of a process showing the re-sizing of the delay buffers.

Referring to FIG. 6, a block diagram of a method (or process) 400 is shown. The method 400 illustrates a process for resizing the delay buffers 184 and/or 184'. The method 400 generally comprises a step (or state) 402, a decision step (or state) 404, a step (or state) 406, a step (or state) 408, a step (or state) 410, a decision step (or state) 412, a step (or state) 414, a step (or state) 416, a decision step (or state) 418, a step (or state) 420 and a step (or state) 422.

The step 402 may be a start state. The decision step 404 may determine if a source failure has occurred. If so, the method 400 moves to the state 406. If not, the method 400 moves to the step 408, which ends the method 400. In the step 406, the method 400 retrieves a wall time of a last frame of a previous source and a first frame of a next source. Next, the state 410 determines a difference between the last frame of the previous source and the first frame of the next source. Next, the decision state 412 determines if the active source led the hot standby source. If so, the method 400 moves to the state 414, which makes a relative reduction to the delay buffer 184 or 184' of the new active source, then moves to the step 416. The step 416 completes the failover process, then moves to the end step 408. If the decision step 412 determines that the active source did not lead the standby source, the method 400 moves to the decision state 418.

The decision state 418 determines if the active source lagged the standby source. If so, the method 400 moves to the state 420, which makes a relative increase to the delay buffer (184 or 184') of the new active source. The method 400 then moves to the state 416, which completes the source failover, then ends at the state 408. If the decision state 418 determines that the active source did not lag the standby source, the method 400 moves to the step 422, which keeps the size of the delay buffer (184 or 184') of the new active source the same. The method 400 then moves to the step 416, which completes the failover, then ends at the step 408.

Providing a frame accurate output without gaps is made possible by the delay buffers 184 and/or 184'. The delay buffers 184 and 184' accommodate differences in network latency between the network delivering the active input bitstream SOURCE_1 and the network delivering the hot standby input bitstream SOURCE_2. When the active input SOURCE_1 is started, there is no guarantee that the hot standby input SOURCE_2 will be available. Therefore, the device 100 does not know ahead of time whether the hot standby input signal SOURCE_1 will lead or lag the active input signal SOURCE_2 with respect to network latency and/or arrival time.

Consider an example where the active input SOURCE_1 leads (e.g., arrives earlier than) the hot standby input SOURCE_2 by 500 msec. Without the delay buffer 184', the desired frame in the pipeline 162 (e.g., the frame with a timecode one greater than previous frame passed to the output pipeline 170) would not be available on the hot standby input at the time of an input switch. So, either the input switch would not be frame accurate or the encoder in the transcoding pipeline 170 would have to wait 500 msec for the accurate frame to arrive, which could underflow the signal OUTPUT. With a delay buffer 184 in the active input pipeline 160 of >=500 msec, the frames from the decoder 182 are delayed so that the frame is immediately available on the hot standby input at the time of the input switch.

Consider another example where the active input lags (arrives later than) the hot standby input by 500 msec. Without the delay buffer 184, the desired frame would have already been discarded before the input switch occurred. Therefore, the delay buffer 184' is used on the hot standby input pipeline 162. To achieve +/-500 msec of network tolerance, 500 msec of delay on the active input and 2× that, or 1 second, of delay on the hot standby input is needed. The extra 500 msec compensates for the 500 msec delay buffer 184 on the active input.

500 msec is used as an example. The particular amount of delay implemented may be varied to meet the design criteria of a particular implementation. In one example, a user configurable parameter may be used so that the operator may tune the maximum delay buffer occupancy based on the memory available in their system and the expected network latency deviation between inputs.

The delay buffers 184 and/or 184' help ensure the desired frame is available at the time of a failover. The system 100 still needs to choose when to change inputs. When an input failover occurs, the system inspects the input timecode of the last frame passed to the output pipeline 170. Then frames in the hot standby delay buffer 184' that have a timecode less than or equal to that timecode are dropped. The next frame in that delay buffer 184' will be the first one passed into the output pipeline 170 after the input switch.

Besides accommodating differences in network arrival time, the delay buffers 184 and/or 184' also give time for the failover control logic 132 to monitor the inputs and determine that a failover is necessary. The delay buffers 184 and/or 184' allow the live transcoder system 100 to react and/or failover to the hot standby input SOURCE_2 before bad and/or missing data detected by the input, demux, and/or decoder is ever passed into the output pipeline 170.

Input failover is not instantaneous since the device 100 has to tear down and re-establish part of the pipeline. In a standard live transcoding system, there would be a danger of underflowing the output buffer during the failover. Avoiding underflowing during the failover is overcome via the output buffer 192 that has an occupancy initialized to a level that is greater than the amount that is expected to be drained in the maximum time needed for an input switch to occur at the target output bitrate. An independent high-priority thread responsible for pacing data out of the output buffer 192 to the output 144 ensures that data is paced from the output pipeline 170 during the input failover so that there is not an observable discontinuity or timing anomaly on the signal OUTPUT. Once the failover is complete, the occupancy of the output buffer 192 will be restored to the initial target occupancy by carefully controlling the size of the delay buffers 184 and/or 184' as described below.

The device 100 generally ensures that the level of the output buffer 192 is restored in a steady state. The occupancy of the output buffer 192 is ultimately controlled by the input since (other than delays from the delay buffers 184 and/or 184') live inputs are processed as fast as possible. The system 100 associates a system clock wall time with a presentation time stamp (PTS) of each input frame. In one example of a MPEG2 transport stream input over UDP, a system clock time may be recorded. Each program clock reference (PCR) is received. Each PTS is converted into a timebase of the local system clock using an association described in EQ1:

$$WTsys=WTper+(PTS-PCR/300) \quad (EQ1)$$

The time WTsys may be a system clock wall time associated with the frame that has a presentation timestamp of PTS. The value PCR may be the last program clock reference received. The time WTper may be the system clock wall time sampled when the system received the last program clock reference (PCR). In another example of a serial digital interface (SDI) input, the system clock may be sampled directly when the frame is received. The wall time associated with the PTS for other inputs may be similarly derived When an input switch (e.g., failover) occurs, the difference in wall time between the last frame of the previous input and the first frame of the next input may determine how much the output buffer 192 would change in size if no adjustment was made. Information from the difference in wall time between the last frame of the previous input and the first frame of the next input may be used to resize the delay buffer 184 and/or 184' of the newly active input. For example, if the active input leads the hot standby by 100 msec, then on an input switch the delay buffer 184 and/or 184' of the new input would be reduced by 100 msec relative to the level of the previous active delay buffer to maintain the previous output buffer occupancy.

An initial size of the delay buffer 184 (e.g., USER_MSEC) may be a user configurable parameter (e.g., a time specified in milliseconds). The initial size of the delay buffer 184' may be a user configurable parameter set to two times the size of the delay buffer 184 (e.g., 2*USER_MSEC). In some embodiments, the initial size of the delay buffer 184 and/or 184' may be a default value. In some embodiments, the initial size of the delay buffer 184 and/or 184' may be a preset value. In other embodiments, the initial size of the delay buffer 184 and/or 184' may be determined based on a size of the memory 120 and/or the processing capability of the processor 130. For example, the initial size of the delay buffer 184 and/or 184' may be determined independently of any knowledge of the relative timing of the bitstreams (e.g., the hot standby input SOURCE_2 may not be initially present). The total amount of buffering used (e.g., the total buffering of the delay buffer 184 and the delay buffer 184') may be 3*USER_MSEC.

During a failover transition both the delay buffer 184 and the delay buffer 184' may be re-sized. The size of the delay buffer 184 or 184' in the new active input pipeline may be determined (e.g., as described in connection with FIGS. 6 and 7). The size of the delay buffer 184 or 184' in the new standby pipeline may be re-sized such that the total amount of buffering remains unchanged as shown in (EQ2):

$$NewDelayBufferStandby=(3*USER\_MSEC)-NewDelayBufferActive \quad (EQ2)$$

Figure 7A:
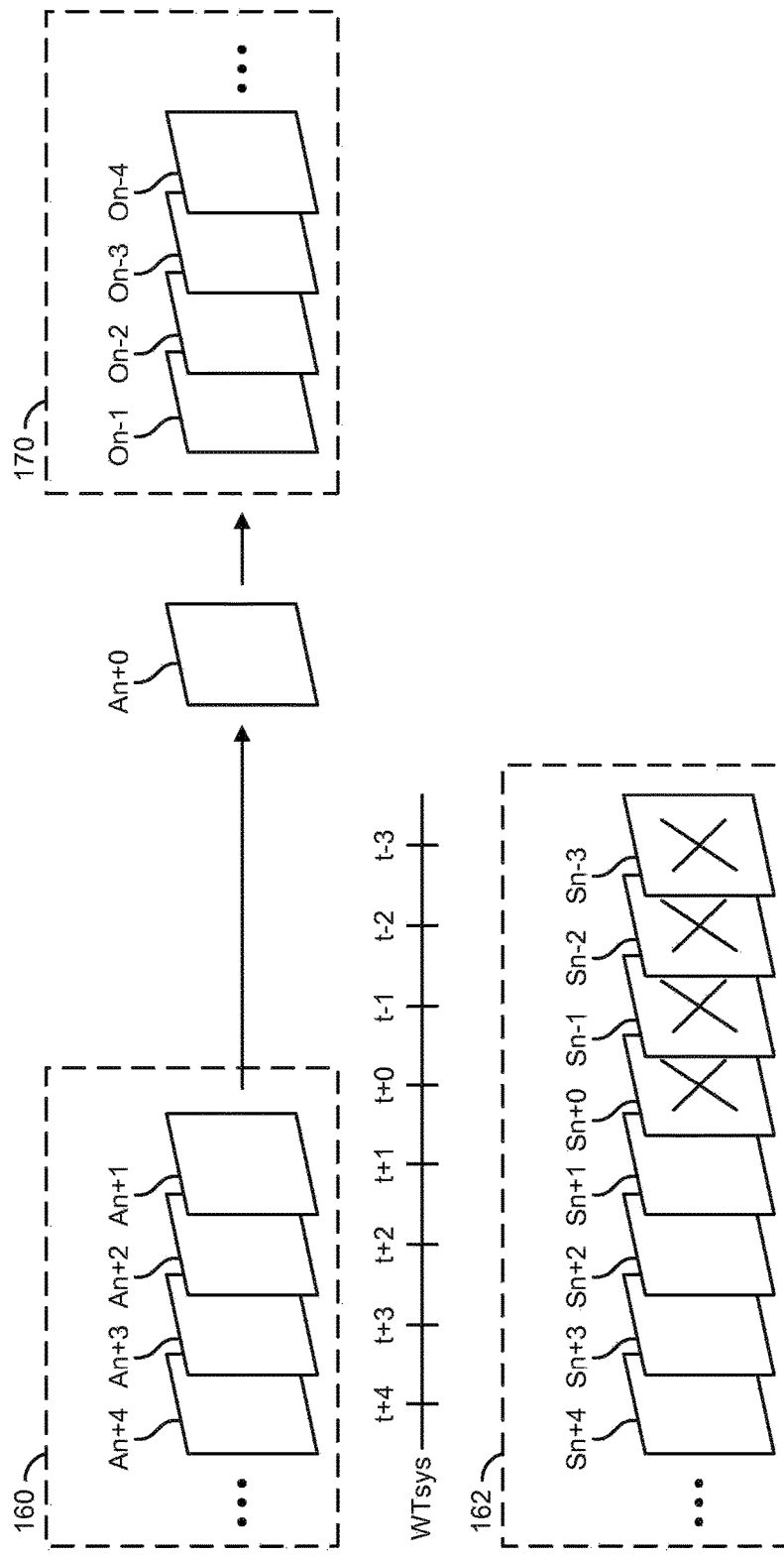
FIG. 7a is a diagram showing buffer occupancy when the arrival of frames is matched.

Referring to FIGS. 7a-7c, operation of the device 100 with buffer occupancy of the active input pipeline 160, the hot standby input pipeline 162, and the output pipeline 170 is shown. Various frames are shown in the active input pipeline 160, the hot standby input pipeline 162, and the output pipeline 170. The frames in the active input pipeline 160 and the frames in the hot standby input pipeline 162 may be the same frame (e.g., a frame having the same picture) but received from a different source. For example, the frames in the active input pipeline 160 may be frames received from SOURCE_1 and the frames in the hot standby input pipeline 162 may be frames received from SOURCE_2.

The frames in the output pipeline 170 may be received from the active input pipeline 160 or the hot standby pipeline 162. For example, either a frame from the active input pipeline 160 or a frame from the hot standby output pipeline 162 may be sent to the output pipeline 170. Each frame may have an associated value WTsys. The value WTsys may be a system clock wall time associated with the presentation timestamp of each frame (e.g., shown as t+4 through t−3).

The hot standby pipeline 162 is shown having a buffer depth of 4 greater than the active input pipeline 160. For example, the hot standby pipeline 162 may have a buffer depth of 8 (e.g., in the delay buffer 184') and the active input pipeline may have a buffer depth of 4 (e.g., in the delay buffer 184). The depth of the delay buffer 184 and/or the delay buffer 184' may be varied according to the design criteria of a particular implementation.

Each frame is shown having a subscript label. The subscript label of the frame may indicate whether a frame has the same picture as another frame (e.g., identify the frame). In one example, the subscript label of the frame (e.g., n−3, n+1, etc.) may represent a timecode of the frame. Frames having the same subscript label may represent the same picture. For example, the frame $A_{n+4}$ may represent the same picture as the frame $S_{n+4}$ but may be provided through a different source (e.g., the frame $A_{n+4}$ may be received by SOURCE_1 and the frame $S_{n+4}$ may be received by SOURCE_2).

Referring to FIG. 7a, buffer occupancy when the arrival of frames is matched is shown (e.g., the arrival of SOURCE_1 at the input 140 and the arrival of SOURCE_2 at the input 142 are matched). The active input pipeline 160 is shown having a number of active frames $A_{n+4}$ through $A_{n+1}$. The hot standby pipeline 162 is shown having a number of frames $S_{n+4}$ through $S_{n-3}$. The output pipeline 170 is shown having frames $O_{n-1}$ through $O_{n-4}$. The frame $A_{n+0}$ is shown being presented by the active input pipeline 160 to the output pipeline 170. If no failure occurs, the next frame queued up to be passed to the output pipeline 170 would be the frame $A_{n+1}$. The WTsys of the frame $A_{n+1}$ is shown as t+1.

If a failover happened at this moment (e.g., the active input pipeline 160 was unable to send the frame $A_{n+1}$ to the output pipeline 170), the frame $S_{n+1}$ would need to be sent to the output pipeline 170 to ensure frame accuracy. The frames $S_{n+0}$ through $S_{n-3}$ in the hot standby input pipeline 162 would be dropped (e.g., the corresponding frames $O_{n-1}$ through $O_{n-3}$ and $A_{n+0}$ have already been sent to the output pipeline 170).

The next frame, $S_{n+1}$, is shown having a WTsys of t+1. The WTsys of the frame $S_{n+1}$ and the frame $A_{n+1}$ are equal.

The pipeline 162 will become the new active input pipeline, and the depth of the delay buffers 184 and/or 184' may be re-sized. Since the WTsys of the frames Sn+1 and the frame An+1 are equal, the buffer depth of the pipeline 162 may be re-sized to be the same size as the delay buffer of the previous active pipeline 160 (e.g., a buffer depth of 4).

Referring to FIG. 7b, buffer occupancy when the arrival of frames in the active input pipeline 160 leads the arrival of frames in the hot standby pipeline 162 (e.g., the arrival of SOURCE_i at the input 140 leads the arrival of SOURCE_2 at the input 142 by two frame times) is shown. The active input pipeline 160 is shown having a number of active frames An+4 through An+1. The hot standby pipeline 162 is shown having a number of frames Sn+2 through Sn−5. The output pipeline 170 is shown having frames On−1 through On−4. The frame An+0 is shown being sent from the active input pipeline 160 to the output pipeline 170. If no failure occurs, the next frame queued up to be passed to the output pipeline 170 would be the frame An+1. The WTsys of the frame An+1 is shown as t+1.

If a failover happened at this moment (e.g., the active input pipeline 160 was unable to send the frame An+1 to the output pipeline 170), the frame Sn+1 would need to be sent to the output pipeline 170 to ensure frame accuracy. The frames Sn+0 through Sn−5 in the hot standby input pipeline 162 would be dropped (e.g., the corresponding frames On−1 through On−5 and An+0 have already been sent to the output pipeline 170).

The next frame, Sn+1, is shown having a WTsys of t+3. The WTsys of the frame Sn+1 and the frame An+1 are not equal and An+1 leads Sn+1. The pipeline 162 will become the new active input pipeline, and the depth of the delay buffers 184 and/or 184' may be re-sized. Since the WTsys of the frame Sn+1 and the frame An+1 have a difference of 2 with the frame An+1 leading the arrival of the frame Sn+1, the buffer depth of the pipeline 162 may be re-sized to be the size of the delay buffer 184 in the previous active input pipeline 160 minus two frames (e.g., a buffer depth of 2). Decreasing the size of the delay buffer 184' after the failover occurs relative to the occupancy of the delay buffer 184 prior to the failover may compensate for the later arrival of frames from SOURCE_2 relative to SOURCE_1 (e.g., to ensure the output buffer 192 does not underfloor).

Referring to FIG. 7c, buffer occupancy when the arrival of frames in the active input pipeline 160 lags the arrival of frames in the hot standby pipeline 162 (e.g., the arrival of SOURCE_i at the input 140 lags the arrival of SOURCE_2 at the input 142 by two frame times) is shown. The active input pipeline 160 is shown having a number of active frames An+4 through An+1. The hot standby pipeline 162 is shown having a number of frames Sn+6 through Sn−i. The output pipeline 170 is shown having frames On−1 through On−4. The frame An+0 is shown being sent from the active input pipeline 160 to the output pipeline 170. If no failure occurs, the next frame queued up to be passed to the output pipeline 170 would be the frame An+1. The WTsys of the frame An+1 is shown as t+1.

If a failover happened at this moment (e.g., the active input pipeline 160 was unable to send the frame An+1 to the output pipeline 170), the frame Sn+1 would need to be sent to the output pipeline 170 to ensure frame accuracy. The frames Sn−1 and Sn+0 in the hot standby input pipeline 162 would be dropped (e.g., the corresponding frames On−1 and An+0 have already been sent to the output pipeline 170).

The next frame, Sn+1, is shown having a WTsys of t−1. The WTsys of the frame Sn+1 and the frame An+1 are not equal and An+1 lags Sn+1. The pipeline 162 will become the new active input pipeline, and the depth of the delay buffers 184 and/or 184' may be re-sized. Since the WTsys of the frame Sn+1 and the frame An+1 have a difference of 2 with the frame An+1 lagging the arrival of the frame Sn+1, the buffer depth of the pipeline 162 may be re-sized to be the size of the delay buffer 184 in the previous active input pipeline 160 plus two frames (e.g., a buffer depth of 6). Increasing the size of the delay buffer 184' after the failover occurs relative to the occupancy of the delay buffer 184 prior to the failover may compensate for the earlier arrival of frames from SOURCE_2 relative to SOURCE_1 (e.g., to ensure the output buffer 192 does not overflow).

Figure 8:
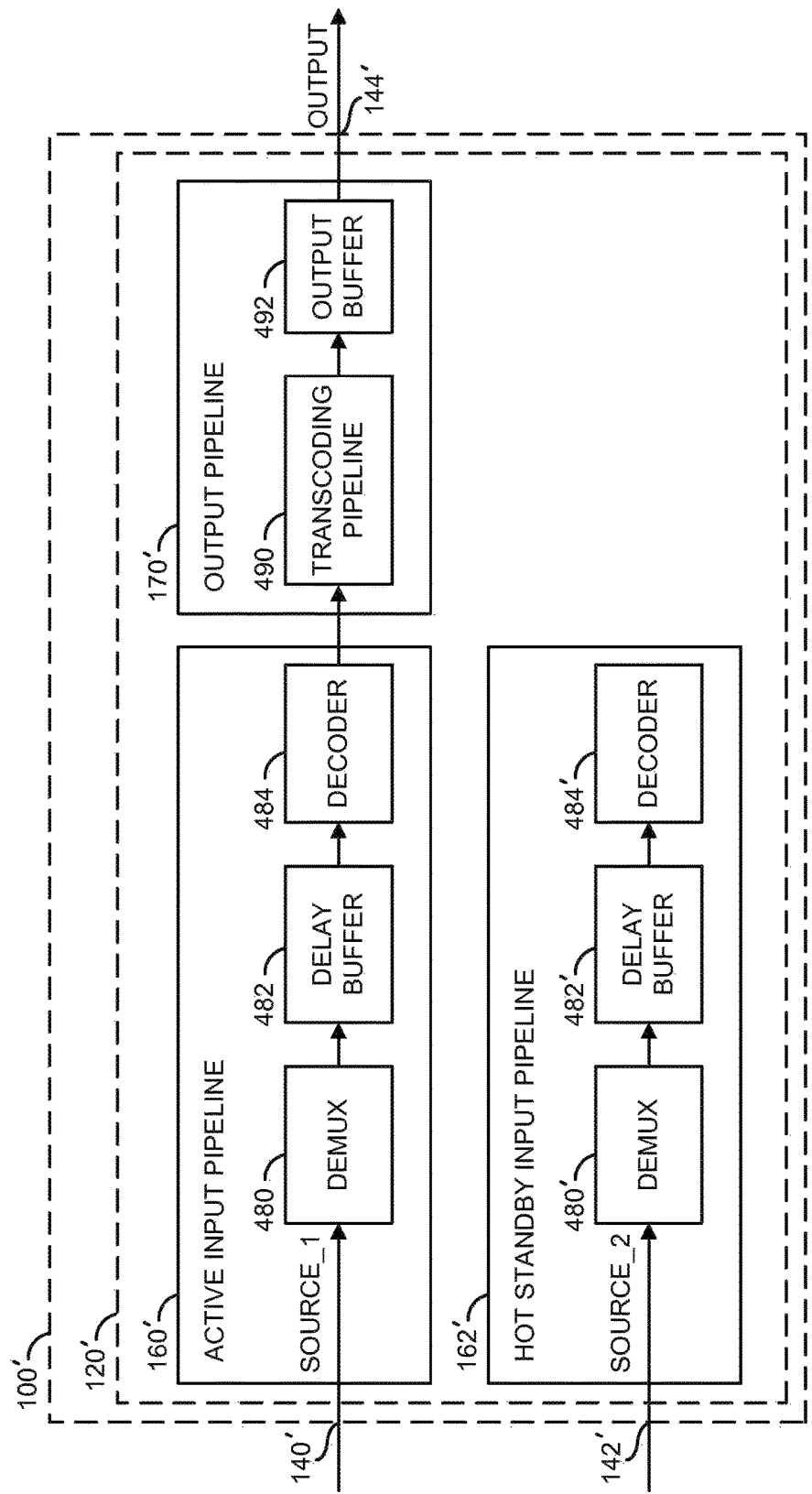
FIG. 8 is a diagram showing an alternate embodiment of the present invention.

Referring to FIG. 8 an alternate detailed diagram of the apparatus 100' is shown. The apparatus 100' is shown comprising the memory 120'. The memory 120' is shown comprising an active input pipeline 160', a hot standby pipeline 162' and an output pipeline 170'. The active input pipeline 160' generally comprises a block (or circuit) 480, a block (or circuit) 482 and a block (or circuit) 484. The circuit 480 may be implemented as the demultiplexing circuit. The circuit 482 may be implemented as the delay buffer. The circuit 484 may be implemented as the decoder circuit Similarly, the pipeline 162' may have a block (or circuit) 480', a block (or circuit) 482' and a block (or circuit) 484'. The circuits 480', 482' and 484' may have similar implementations as the circuits 480, 482 and 484. The output pipeline 170' generally comprises a block (or circuit) 490 and a block (or circuit) 492. The circuit 490 may be implemented as the transcoding pipeline. The circuit 492 may be implemented as the output buffer.

In the embodiment shown in FIG. 3, the delay buffers 184 and 184' are shown after the decoders 182 and 182'. In the embodiment shown in FIG. 8, the device 100' has the delay buffers 482 and 482' between the demux 480 (or 480') and the decoder 484 (or 484'). In such an implementation, the inputs are often compressed and thus take less memory to buffer prior to the decoders 484 and 484'. The embodiment shown in the device 100 and the embodiment shown in the device 100' may have similar latency and/or fast failover characteristics.

The output of the delay buffer 482' in the hot standby input pipeline 162' needs to monitor pictures being passed into the output pipeline 170' by the active input pipeline 160' to ensure that the hot standby input keeps up with the active input. That is, if the active input decodes and passes to the output pipeline 170' a picture with timecode T, then the hot standby input pipeline 162' should decode and discard all pictures with timecode less than or equal to T. Failing to do so would mean that at the time of the failover, even though the target frame should be in the hot standby input delay buffer 482' it could be proceeded by many other frames that (due to the nature of long-GOP reference pictures) would need to be decoded in order to successfully decode the target frame. The processing time required to decode those extra pictures could result in an underflow of the output buffer 492.

The device 100 and/or 100' provides a frame accurate hot failover of a live transcoding system from one multimedia input to an alternate multimedia input without any observable audio-visual discontinuities or timing anomalies on the output.

The functions performed by the diagrams of FIGS. 4-6 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. A method comprising:
   receiving a first bitstream and a second bitstream, wherein the first bitstream is sent to a first pipeline and the second bitstream is sent to a second pipeline, the first bitstream and the second bitstream including redundant information received from independent sources;
   sending an output of the first pipeline to an output pipeline;
   determining an error has occurred in the first pipeline;
   adjusting a first size of a buffer of the first pipeline and a second size of a buffer of the second pipeline based at least on timing information associated with the first bitstream and the second bitstream; and
   sending an output of the second pipeline to the output pipeline.

2. The method of claim 1, wherein sending an output of the second pipeline to the output pipeline, further comprises:
   identifying a timecode associated with a last frame sent to the output pipeline from the first pipeline;
   identifying a timecode associated with a next frame in the buffer associated with the second pipeline;
   determining the timecode associated with the next frame is less than or equal to the timecode of the last frame; and
   dropping the next frame.

3. The method of claim 1, wherein sending an output of the second pipeline to the output pipeline, further comprises:
   identifying a timecode associated with a last frame sent to the output pipeline from the first pipeline;
   identifying a timecode associated with a next frame in the buffer associated with the second pipeline;
   determining the timecode associated with the next frame is greater than the timecode of the last frame; and
   sending the next frame to the output pipeline.

4. The method of claim 1, wherein adjusting a first size of a buffer of the first pipeline and a second size of the buffer of the second pipeline based at least on timing information associated with the first bitstream and the second bitstream, further comprises:
   identifying a timecode associated with a last frame sent to the output pipeline from the first pipeline;
   identifying a timecode associated with a next frame in the buffer associated with the second pipeline;
   determining the timecode associated with the next frame is greater than the timecode of the last frame; and
   increasing the size of the buffer of the second pipeline based at least on a difference between the timecode associated with the next frame and the timecode of the last frame.

5. The method of claim 1, wherein adjusting a size of a buffer of the first pipeline and a size of the buffer of the second pipeline based at least on a time of reception of the first bitstream and the second bitstream, further comprises:
   identifying a timecode associated with a last frame sent to the output pipeline from the first pipeline;
   identifying a timecode associated with a next frame in the buffer associated with the second pipeline;
   determining the timecode associated with the next frame is less than the timecode of the last frame; and
   decreasing the size of the buffer of the second pipeline based at least on a difference between the timecode associated with the next frame and the timecode of the last frame.

6. The method of claim 1, wherein adjusting a size of a buffer of the first pipeline and a size of the buffer of the second pipeline based at least on a time of reception of the first bitstream and the second bitstream, further comprises:
identifying a timecode associated with a last frame sent to the output pipeline from the first pipeline;
identifying a timecode associated with a next frame in the buffer associated with the second pipeline;
determining the timecode associated with the next frame is equal to the timecode of the last frame; and
maintaining the size of the buffer of the second pipeline.

7. The method of claim 1, wherein the first pipeline and the second pipeline are each configured to perform one or more of demultiplexing, decoding, or buffering.

8. The method of claim 1, wherein the output pipeline comprises an output buffer having a size based at least on an output bitrate and a time to switch from the output of the first pipeline and the output of the second pipeline.

9. A system comprising:
at least one processor; and
at least one computer readable storage medium including instructions stored thereon which, when executed, cause the system to:
receive a first bitstream and a second bitstream, wherein the first bitstream is sent to a first pipeline and the second bitstream is sent to a second pipeline, the first bitstream and the second bitstream including redundant information received from independent sources;
send an output of the first pipeline to an output pipeline;
determine an error has occurred in the first pipeline;
adjust a first size of a buffer of the first pipeline and a second size of a buffer of the second pipeline based at least on timing information associated with the first bitstream and the second bitstream; and
send an output of the second pipeline to the output pipeline.

10. The system of claim 9, wherein the instructions to send an output of the second pipeline to the output pipeline, when executed, further cause the system to:
identify a timecode associated with a last frame sent to the output pipeline from the first pipeline;
identify a timecode associated with a next frame in the buffer associated with the second pipeline;
determine the timecode associated with the next frame is less than or equal to the timecode of the last frame; and
drop the next frame.

11. The system of claim 9, wherein the instructions to send an output of the second pipeline to the output pipeline, when executed, further cause the system to:
identify a timecode associated with a last frame sent to the output pipeline from the first pipeline;
identify a timecode associated with a next frame in the buffer associated with the second pipeline;
determine the timecode associated with the next frame is greater than the timecode of the last frame; and
send the next frame to the output pipeline.

12. The system of claim 9, wherein the instructions to adjust a size of a buffer of the first pipeline and a size of the buffer of the second pipeline based at least on a time of reception of the first bitstream and the second bitstream, further cause the system to:
identify a timecode associated with a last frame sent to the output pipeline from the first pipeline;
identify a timecode associated with a next frame in the buffer associated with the second pipeline;
determine the timecode associated with the next frame is greater than the timecode of the last frame; and
increase the size of the buffer of the second pipeline based at least on a difference between the timecode associated with the next frame and the timecode of the last frame.

13. The system of claim 9, wherein the instructions to adjust a size of a buffer of the first pipeline and a size of the buffer of the second pipeline based at least on a time of reception of the first bitstream and the second bitstream, further cause the system to:
identify a timecode associated with a last frame sent to the output pipeline from the first pipeline;
identify a timecode associated with a next frame in the buffer associated with the second pipeline;
determine the timecode associated with the next frame is less than the timecode of the last frame; and
decrease the size of the buffer of the second pipeline based at least on a difference between the timecode associated with the next frame and the timecode of the last frame.

14. The system of claim 9, wherein the instructions to adjust a size of a buffer of the first pipeline and a size of the buffer of the second pipeline based at least on a time of reception of the first bitstream and the second bitstream, further cause the system to:
identify a timecode associated with a last frame sent to the output pipeline from the first pipeline;
identify a timecode associated with a next frame in the buffer associated with the second pipeline;
determine the timecode associated with the next frame is equal to the timecode of the last frame; and
maintain the size of the buffer of the second pipeline.

15. The system of claim 9, wherein the first pipeline and the second pipeline are each configured to perform one or more of demultiplexing, decoding, or buffering.

16. The system of claim 9, wherein the output pipeline comprises an output buffer having a size based at least on an output bitrate and a time to switch from the output of the first pipeline and the output of the second pipeline.

17. An apparatus comprising:
a first pipeline configured to receive a first bitstream;
a second pipeline configured to receive a second bitstream;
an output pipeline configured to receive an output from either of the first pipeline or the second pipeline, wherein the first bitstream and the second bitstream include redundant information received from independent sources; and
at least one processor configured to
determine an error has occurred in the first pipeline;
adjust a size of a buffer of the first pipeline and a size of a buffer of the second pipeline based at least on timing information associated with the first bitstream and the second bitstream; and
send the output of the second pipeline to the output pipeline.

18. The apparatus of claim 17, wherein the processor configured to adjust a size of a buffer of the first pipeline and a size of the buffer of the second pipeline based at least on a time of reception of the first bitstream and the second bitstream, is further configured to:
identify a timecode associated with a last frame sent to the output pipeline from the first pipeline;
identify a timecode associated with a next frame in the buffer associated with the second pipeline;
determine the timecode associated with the next frame is greater than the timecode of the last frame; and
increase the size of the buffer of the second pipeline based at least on a difference between the timecode associated with the next frame and the timecode of the last frame.

19. The apparatus of claim 17, wherein the instructions to adjust a size of a buffer of the first pipeline and a size of the buffer of the second pipeline based at least on a time of reception of the first bitstream and the second bitstream, further cause the system to:
- identify a timecode associated with a last frame sent to the output pipeline from the first pipeline;
- identify a timecode associated with a next frame in the buffer associated with the second pipeline;
- determine the timecode associated with the next frame is less than the timecode of the last frame; and
- decrease the size of the buffer of the second pipeline based at least on a difference between the timecode associated with the next frame and the timecode of the last frame.

20. The apparatus of claim 17, wherein the instructions to adjust a size of a buffer of the first pipeline and a size of the buffer of the second pipeline based at least on a time of reception of the first bitstream and the second bitstream, further cause the system to:
- identify a timecode associated with a last frame sent to the output pipeline from the first pipeline;
- identify a timecode associated with a next frame in the buffer associated with the second pipeline;
- determine the timecode associated with the next frame is equal to the timecode of the last frame; and
- maintain the size of the buffer of the second pipeline.

* * * * *